United States Patent Office 2,834,793
Patented May 13, 1958

2,834,793

DERIVATIVES OF 4-ANILINO-3-NITROBENZENE-SULFONAMIDE

Herbert K. Livingston, Wilmington, Del., and Alfred J. Johnson, Woodstown, N. J., assignors to E. I. du Pont de Nemours and Company, Wilmington, Del., a corporation of Delaware No Drawing. Application August 8, 1957
Serial No. 676,915

3 Claims. (Cl. 260—397.7)

This invention relates to novel tertiary bases derived from 4-anilino-3-nitrobenzene-sulfonamide, which are useful per se and which may be converted into useful ammonium salts or quaternary ammonium compounds. In all these forms, the novel compounds are useful as dyes for acid-modified "Dacron" polyester fiber, being applicable thereto from an acidified aqueous dye bath when in the form of tertiary base, or from a neutral aqueous dye bath when in the form of salt or quaternary ammonium compound.

By acid-modified "Dacron" fiber, we mean polyethylene-terephthalate fiber containing metal sulfonate groups, as described more fully and claimed in Belgian Patent No. 549,179, granted July 14, 1957, to E. I. du Pont de Nemours and Company, on the application of J. M. Griffing and W. R. Remington.

More particularly, this invention deals first of all with novel bases of the formula

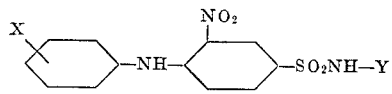

wherein X stands for hydrogen, alkyl of 1 to 4 C-atoms, alkoxy of 1 to 4 C-atoms, or phenyl, and wherein Y is a tertiary nitrogenous base radical selected from the group consisting of dialkylaminoalkyl, for instance dialkylaminoethyl or dialkylaminopropyl; dialkylaminoalkyl-phenyl, for instance $C_6H_4$—$CH_2$—NRR', $C_6H_4$—$CH_2CH_2$—NRR' or $C_6H_4$—$CH_2CH_2CH_2$—NRR'

R and R' being alkyl radicals of 1 to 4 C-atoms each; and dialkylaminoalkoxy-phenyl, for instance $C_6H_4$—$OCH_2CH_2$—NRR' and $C_6H_4$—$OCH_2CH_2CH_2$—NRR'

R and R' being alkyl radicals of 1 to 4 C-atoms each.

In all the instances above, the alkyl radicals mentioned are preferably radicals containing from 1 to 4 C-atoms each, while the alkoxy group of the dialkylaminoalkoxy-phenyl radical contains from 2 to 4 C-atoms.

These compounds are synthesized by reacting in aqueous alkaline medium 4-chloro-3-nitrobenzene-sulfonyl chloride with the appropriate N,N-dialkyl diamine of formula $H_2N$—Y, for instance

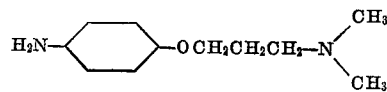

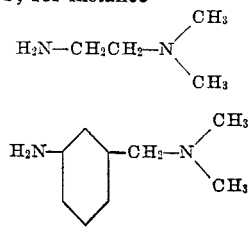

or

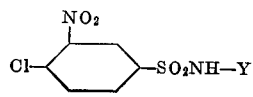

and further reacting the resulting 4-chloro compound of the formula

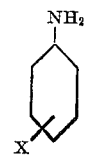

with the selected aniline compound of formula

NH₂ (with X substituent on ring)

X and Y being substituents as above defined.

The reaction product resulting from the second reaction is generally isolated in the form of free base, having the formula hereinabove given. In this form the product may be applied to acid-modified "Dacron" polyester fiber as a basic dye; that is, from an acidified aqueous bath, producing on the fiber yellow dyeings of good light fastness.

But said free base may also be converted into a salt form by dissolving the base in a suitable organic solvent, for instance methanol or butanol, warming up, and adding a suitable acid such as hydrogen chloride, hydrogen bromide, sulfuric acid, nitric acid, phosphoric acid, etc. The acid may be anhydrous or it may be in the form of an aqueous solution.

The free base may also be converted in known manner into quaternary ammonium compounds, using any convenient quaternizing agent, for instance dimethyl sulfate, benzyl chloride, phenethyl chloride, etc.

The salts and quaternary compounds thus formed are directly soluble in water and may be applied to the mentioned fiber from an aqueous bath, producing thereon yellow dyeings of good light fastness.

Without limiting this invention, the following examples are given to illustrate our preferred mode of operation. Parts mentioned are by weight.

*Example 1*

(a) *Tertiary amine base.*—Eight parts of N,N-dimethyl-1,3-propanediamine are added to a stirred suspension of 10 parts of 4-chloro-3-nitrobenzenesulfonyl chloride in 50 parts of water at 20° to 25° C. After the mixture is stirred at this temperature for 5 hours, the product of the reaction, 4 - chloro - N - (3-dimethylaminopropyl)-3-nitrobenzenesulfonamide, is filtered off, washed with water and dried.

A mixture consisting of 6.3 parts of the amide thus obtained, 3.8 parts of aniline and 38 parts of water is stirred and heated under reflux at 100° C. for 4 hours. After adding 1.5 parts of sodium carbonate, any unchanged aniline is removed by steam distillation. The residual mass is dissolved in dilute hydrochloric acid and precipitated by the gradual addition of sodium carbonate solution. The orange-brown product, N' - (3 - dimethylaminopropyl) - 3 - nitro - N⁴ - phenylsulfanilamide, is filtered off, washed with water and dried. From a slightly acidic, hot aqueous dye bath this product dyes acid-modified "Dacron" polyester fiber in a yellow shade having excellent fastness properties.

(b) *Salt form.*—The hydrochloride salt of this phenylsulfanilamide is prepared by dissolving the above named compound in methanol or butanol, warming and passingin hydrochloric acid gas. The mixture is cooled, and the product is filtered off, washed with the solvent, and dried.

(c) *Quaternary compound.*—One part of dimethyl sulfate is added during 1 hour to a solution of 3 parts of N'-(3-diemthylaminopropyl) - 3 - nitro - N⁴ - phenylsulfanilamide in 50 parts of monochlorobenzene at 60° C. The quaternary derivative is separated from the monochlorobenzene as an oil which is dissolved in acetone. The filtered acetone solution yields, on evaporation, yellow water-soluble crystals of trimethyl[3-(N⁴-phenyl-3-nitrosulfanilamido)propyl]ammonium methyl sulfate,

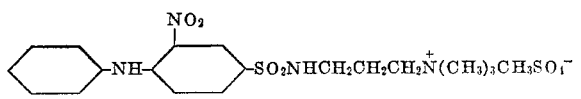

The dyes of parts (b) and (c) above are soluble in hot water from which the acid-modified "Dacron" fiber is dyed in a yellow shade which exhibits excellent fastness.

When the N,N-dimethyl-1,3-propanediamine in part (a) of this example is replaced by equivalent amounts of N,N-dimethyl-1,2-ethanediamine, N-ethyl-N-methyl - 1,3-propanediamine or N - isopropyl-N-methyl-1,3-propanediamine, the corresponding tertiary amino compounds are obtained. These compounds are converted to their acid salts and quaternary forms by the methods described in parts (b) and (c), and in Example 2.

*Example 2*

*Quaternary compound.*—A mixture consisting of 40 parts of the end product of Example 1(a), 15 parts of benzyl chloride and 200 parts of ethyl acetate is heated and stirred under reflux for 2 hours. After allowing the reaction mass to cool, one collects the pure, yellow crystalline product on a filter. The benzyldimethyl[3-(N⁴-phenyl-3-nitrosulfanilamido)propyl]ammonium chloride obtained is similar to the quaternary dye of Example 1(c).

*Example 3*

A mixture of 5.5 parts of 4-chloro-N-(3-dimethylaminopropyl)-3-nitrobenzenesulfonamide prepared as in Example 1(a), 2.8 parts of p-phenetidine, 60 parts of water, 2.5 parts of sodium acetate crystals and a small amount of a long chain alcohol sulfate is stirred under reflux at 100° C. for 4 to 5 hours. After allowing the mixture to cool, the oily condensation product is separated and washed with water. The washed oil is added to 60 parts of butanol, the mixture is heated to 60° C., and 2.2 parts of dimethyl sulfate are slowly added. After stirring at 60° C. for one hour the solvent is removed by evaporation, leaving the product, [3-(N⁴-[p-ethoxyphenyl]-3 - nitrosulfanilamido)propyl]trimethylammonium methyl sulfate, in the form of an oil, which does not crystallize on cooling.

*Example 4*

If the p-phenetidine in Example 3 is replaced by 2.5 parts of p-anisidine, the corresponding p-methoxyphenyl derivative is obtained as tertiary amine. This compound may then be quaternized by the methods described in Examples 2 and 3.

When an equivalent amount of p-butoxyaniline is used, the corresponding yellow dye is obtained.

In a similar manner the corresponding p-tolyl, p-butylphenyl and p-isobutylphenyl derivatives are prepared by using equivalent amounts of p-toluidine, p-butylaniline, and p-isobutylaniline respectively, in place of p-phenetidine in Example 3. These tertiary amines are quaternized by the methods described in Examples 2 and 3.

*Example 5*

To a mixture of 5.24 parts of N,N-dimethyl-1,3-propanediamine, 2.8 parts of sodium carbonate in 25 parts of water, and 15 parts of isopropanol, is gradually added 12.5 parts of 4-chloro-3-nitrobenzenesulfonyl chloride while keeping the temperature at 20° to 25° C. The mixture is stirred at 20° to 25° C. for 5 hours. Then there is added 2.8 parts of sodium carbonate and 9.3 parts of 4-biphenylamine. The temperature is raised to 60° C. and maintained for one hour, after which the temperature is raised to the boiling point, and the mixture is refluxed for 4 hours. After cooling the mass to room temperature it is extracted with benzene and the benzene is evaporated to give the dye, N'-(3-dimethylaminopropyl)-N⁴-(4-biphenylyl)-3-nitrosulfanilamide. By crystallization from butanol the purified dye is obtained in the form of orange-yellow crystals. It gives fast yellow shades on acid-modified "Dacron" when applied to this polyester fiber from a slightly acidic, hot aqueous dye bath.

Similar dyes are obtained when the N,N-dimethyl-1,3-propanediamine in this example is replaced with equivalent amounts of N,N-dibutyl-1,2-ethanediamine, β-dimethylamino-p - phenetidine, p - (3 - dimethylaminopropoxy)aniline or Nᵅ,Nᵅ-dimethyltoluene-α,3-diamine.

The dye bases prepared in this example are converted to their hydrochloride salts by the method described in Example 1(b). The bases are quaternized by the methods described in Examples 1(c) and 2.

*Example 6*

A mixture of 12.5 parts of 4-chloro-3-nitrobenzenesulfonyl chloride, 13 parts of β-dimethylamino-p-phenetidine dihydrochloride and 5.6 parts of sodium carbonate in 30 parts of water is stirred at 20° to 25° C. for 5 hours. Then 5.12 parts of aniline and 2.76 parts of sodium carbonate are added and the mixture is stirred at 60° C. for 4 hours and finally refluxed at 100° C. for 4 hours. Any unchanged aniline is removed by steam distillation. The dye base is filtered off and dissolved in isopropyl alcohol (or methyl alcohol) by warming on a water bath, and a molecular excess (based on the dye) of anhydrous hydrochloric acid is passed into the warm solution. After cooling the acid-treated solution, one filters off the yellow crystals of β-dimethylamino-3-nitro-N⁴-phenylsulfanilo-p-phenetidide hydrochloride.

By replacing aniline in this example with an equivalent amount of p-phenetidine one obtains the β-dimethylamino-N⁴-(p-ethoxyphenyl)-3-nitrosulfanilo - p - phenetidide hydrochloride.

When the β-dimethylamino-p-phenetidine dihydrochloride above is replaced by the dihydrochloride of p-(3-diethylaminopropoxy)aniline the similar yellow dye, 4' - (3 - diethylaminopropoxy) - 3 - nitro - N⁴ - phenylsulfanilanilide hydrochloride is obtained.

The above dye bases are converted to their quaternary derivatives by the methods described in Examples 1 and 2. In the free base, salt form or quaternary base form, these dyes color acid-modified "Dacron" polyester fiber from a slightly acidic, hot aqueous dye bath in fast yellow shades.

*Example 7*

A mixture of 26 parts of 4-chloro-3-nitrobenzene-sulfonyl chloride, 26 parts of water, 26 parts of isopropanol and 15 parts of Nᵅ,Nᵅ-dimethyltoluene,α,3-diamine is stirred at 20° to 25° C. for one hour. After adding 50 parts of water and heating to 50° C. in one hour, 5 parts of sodium carbonate are slowly added and the mixture is stirred at 50° C. for one hour. After cooling to room temperature the product, 4-chloro-α-dimethylamino-3-nitrobenzenesulfon-m-toluidide, is filtered off, washed and dried. A mixture of 25 parts of the above condensation product, 6.3 parts of aniline, 80 parts of water, 40 parts of n-propanol and 3.8 parts of sodium carbonate is stirred at 60° C. for one hour and then refluxed at 98° C. for 4 hours. The reaction mass is cooled to room temperature and the dye base, α-dimethylamino-3-nitro-N⁴-phenylsulfanilo-m-toluidide, is filtered off, washed and dried. It is converted to the hydrochloride by dissolving in warm isopropanol and adding anhydrous hydrochloric acid. The solution is cooled and the dye hydrochloride is filtered off and dried. It has the structure

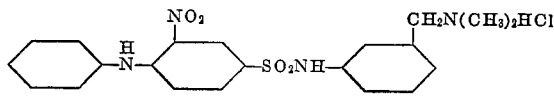

Likewise when the N$^\alpha$,N$^\alpha$-dimethyltoluene-α,3-diamine is replaced by an equivalent amount of N$^\alpha$,N$^\alpha$-dipropyl-toluene-α,3-diamine or p-(3-dimethylaminopropyl) aniline, similar yellow dyes are obtained.

Yellow dyes for acid-modified "Dacron" polyster fiber are also obtained when the aniline in this example is replaced by equivalent amounts of other amines such as, p-toluidine, p-anisidine, p-phenetidine and 4-biphenylamine.

These dye bases are quaternized by the methods described in Examples 1 and 2.

It will be understood that the details of the above examples may be varied widely within the skill of those engaged in this art.

For instance, in lieu of hydrogen chloride in the above examples, other acids may be employed, for example hydrobromic, nitric, sulfuric or phosphoric acid. Likewise, in aqueous solution, the dye cation will be associated with acid anions upon addition of salts such as sodium or potassium sulfate, chloride, phosphate, etc.

As quaternizing agents, in lieu of or in addition to those mentioned in the examples, any known quaternizing agent may be employed, including specifically the following: p-CH$_3$C$_6$H$_4$CH$_2$Cl, C$_6$H$_5$CH$_2$CH$_2$Cl, C$_6$H$_5$CH$_2$Cl, or their bromide analogs; dimethyl sulfate, diethyl sulfate, dipropyl sulfate, dibutyl sulfate and short chain aliphatic chlorides and bromides in general.

The X-substituent in the anilino radical may be in position, para, meta or ortho to the NH-group. In lieu of the various monotertiary diamines mentioned in the above examples for initial condensation with 4-chloro-3-nitro-benzenesulfonyl chloride, the corresponding mono- or dihydrochlorides may be employed, if more readily available, provided a corresponding adjustment is made in the quantity of sodium carbonate employed. Conversely, where the dihydrochloride of the initial material is mentioned, it may be replaced by the corresponding base, with or without an adjustment in the quantity of sodium carbonate employed, inasmuch as an excess of the latter makes no difference.

The alkali metal carbonate may be dispensed with altogether where a large excess of the monotertiary diamine is employed, as shown for instance in Example 1(a).

The novel compounds of the invention are useful primarily as yellow dyes for acid-modified "Dacron" polyester fiber. Their chief advantages are those of light fastness and water solubility. This achievement is remarkable when it is considered that only a very limited number of high quality dyes have been discovered heretofore that are suitable for this new fiber.

We claim as our invention:

1. A dye compound of the group consisting of the free base form, salts and quaternized compounds of a compound whose free base form corresponds to the formula

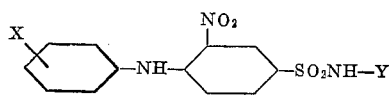

wherein Y is a tertiary nitrogenous base radical of the group consisting of dialkylaminoalkyl, dialkylaminoalkyl-phenyl and dialkylaminoalkoxy-phenyl, wherein all the alkyl radicals named contain not over 4 C-atoms each, while the alkoxy radical contains from 2 to 4 C-atoms, and wherein X is a member of the group consisting of hydrogen, alkyl of 1 to 4 C-atoms, alkoxy of 1 to 4 C-atoms and phenyl.

2. N' - (3 - dimethylaminopropyl) - 3 - nitro - N$^4$-phenylsulfanilamide hydrochloride.

3. The quaternary ammonium compounds of N'-(3-dimethylaminopropyl)-3-nitro-N$^4$-phenyl-sulfanilamide.

No references cited.